L. SAVAGE.

Improvement in Low Water Alarms for Steam Boilers.

No. 122,970.　　　　　　　　　　　　　Patented Jan. 23, 1872.

122,970

UNITED STATES PATENT OFFICE.

LINUS SAVAGE, OF ASHTABULA, OHIO.

IMPROVEMENT IN LOW-WATER ALARMS FOR STEAM-BOILERS.

Specification forming part of Letters Patent No. 122,970, dated January 23, 1872.

*To all whom it may concern:*

Be it known that I, LINUS SAVAGE, of Ashtabula, in the county of Ashtabula and State of Ohio, have invented a new and useful Improvement in Low-Water Alarm for Steam-Boilers; and I do hereby declare that the following is a full, clear, and exact description thereof, which will enable others skilled in the art to make and use the same, reference being had to the accompanying drawing forming a part of this specification, in which—

Figure 1:
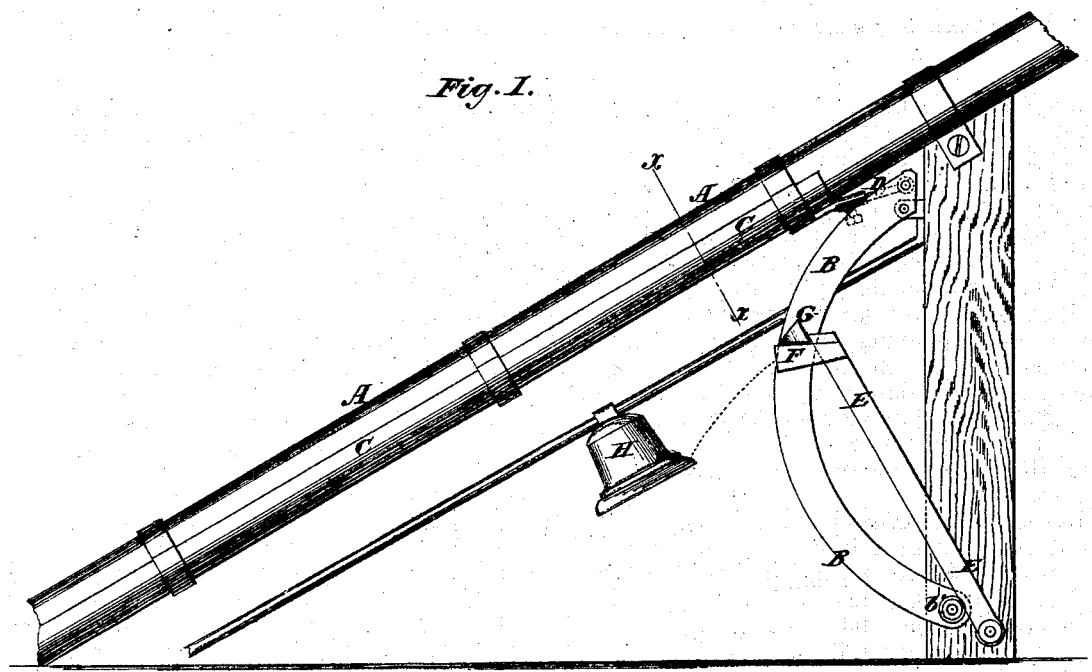
Figure 2:
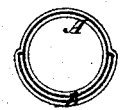

Figure 1 is a side view of my improved device. Fig. 2 is a detail sectional view of the same taken through the line $x$ $x$, Fig. 1.

Similar letters of reference indicate corresponding parts.

My invention has for its object to furnish an improved device, simple in construction and reliable in operation, for giving an alarm when the feed-pump, from any cause, stops working; and it consists in the construction of the device as hereinafter more fully described.

A represents the supply-pipe leading from the pump to the heater, or to the boiler when no heater is used. B is a lever, which is pivoted to some suitable support near its upper end, and which, at its upper end, is connected with the feed-pipe A, or with a bar or plate, C, in contact with said feed-pipe, by a connecting-rod, D, which should be made adjustable to enable the alarm to be set as may be desired. To the side of the lower end of the lever B is pivoted a small friction-roller, $b'$, upon which rests the arm or bar E, which is pivoted at its lower end to some suitable support, and to which, near its upper end, is attached a hammer, F. The upper end of the arm E rests upon a stop, G, attached to or formed upon the side of the lever B. H is a bell, which is suspended from some suitable support in such a position as to be struck by the hammer F as it falls when the arm E escapes from the stop G.

With this construction, while a supply of water is passing through the pipe A the said pipe will be cold; but should the supply of water from any cause cease, the pipe A will become heated and expand, and will heat and expand the bar or plate C connected with the said pipe. This expansion, by means of the connecting-rod D, will operate the lever B, and cause the hammer-arm E to slip from the stop G, sounding the alarm. When the supply of water is again started, the water will cool the pipe A, which will contract, and, by its contraction, draw the arm E back to its place upon the stop G, ready to again sound an alarm.

In substantially the same way the expansion of the supply-pipe, upon the failure of the supply of water, may be used for blowing a whistle, causing an explosion, or giving other alarms.

Having thus described my invention, what I claim as new, and desire to secure by Letters Patent, is—

The combination, as described, with feed-pipe A, of the plate C, rod D, pivoted lever B, and pivoted hammer-bar E, resting on friction-roll $b'$ of said lever at one end and on strap G at the other, to enable said hammer to fall upon a bell at the times and in the manner specified.

LINUS SAVAGE.

Witnesses:
   CHAS. LUCE,
   O. L. LEWIS.